(12) United States Patent
Yokota

(10) Patent No.: US 11,842,064 B2
(45) Date of Patent: Dec. 12, 2023

(54) INFORMATION PROCESSING APPARATUS, CONTROL DEVICE, AND CONTROL METHOD OF CONTROL DEVICE

(71) Applicant: CANON KABUSHIKI KAISHA, Tokyo (JP)

(72) Inventor: Kazuyuki Yokota, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 16/952,823

(22) Filed: Nov. 19, 2020

(65) Prior Publication Data
US 2021/0165593 A1    Jun. 3, 2021

(30) Foreign Application Priority Data
Nov. 29, 2019   (JP) ................. 2019-217570

(51) Int. Cl.
*G06F 3/06* (2006.01)
(52) U.S. Cl.
CPC .......... *G06F 3/0646* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 2013/0254454 A1* | 9/2013 | Ide | ........................ | G06F 3/0688 711/E12.082 |
| 2015/0046605 A1* | 2/2015 | Barrell | .................. | G06F 3/0689 710/5 |
| 2019/0265911 A1* | 8/2019 | Yoo | ........................ | G06F 3/0679 |
| 2019/0286364 A1* | 9/2019 | Gavens | ................. | G06F 3/0655 |
| 2020/0020360 A1* | 1/2020 | Kosuru | .................. | G11C 16/10 |
| 2020/0050402 A1* | 2/2020 | Furey | .................... | G06F 3/0607 |
| 2020/0073793 A1* | 3/2020 | Saito | ........................ | G06F 3/061 |
| 2020/0183592 A1* | 6/2020 | Lim | ..................... | G11C 11/5642 |
| 2020/0183617 A1* | 6/2020 | Tsuruoka | .............. | G06F 3/0659 |
| 2020/0278808 A1* | 9/2020 | Zhu | ........................ | G06F 3/0679 |
| 2021/0042233 A1* | 2/2021 | Lee | ........................ | G06F 3/0679 |

FOREIGN PATENT DOCUMENTS

| | | |
|---|---|---|
| JP | 2010026961 A | 2/2010 |
| JP | 2018169941 A | 11/2018 |
| JP | 2019061483 A | 4/2019 |
| JP | 201975104 A | 5/2019 |

\* cited by examiner

*Primary Examiner* — Stephanie Wu
(74) *Attorney, Agent, or Firm* — Canon U.S.A., Inc. IP Division

(57) ABSTRACT

An information processing apparatus includes a first memory configured to retain a request group, based on requests received by a reception interface, a second memory configured to retain a request group, based on requests received by the reception interface, and a first transmission interface configured to transmit the request group retained in the first memory to the first storage and a second transmission interface configured to transmit the request group retained in the second memory to the second storage. The request group transmitted by the first transmission interface and the request group transmitted by the second transmission interface are different request groups.

17 Claims, 14 Drawing Sheets

FIG.10

| STORAGE DEVICE NAME | COMMAND NOTIFICATION FLAG |
|---|---|
| FIRST STORAGE DEVICE | 1 |
| SECOND STORAGE DEVICE | 1 |

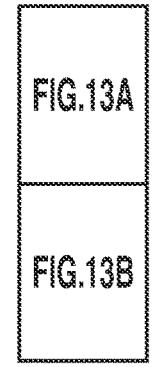
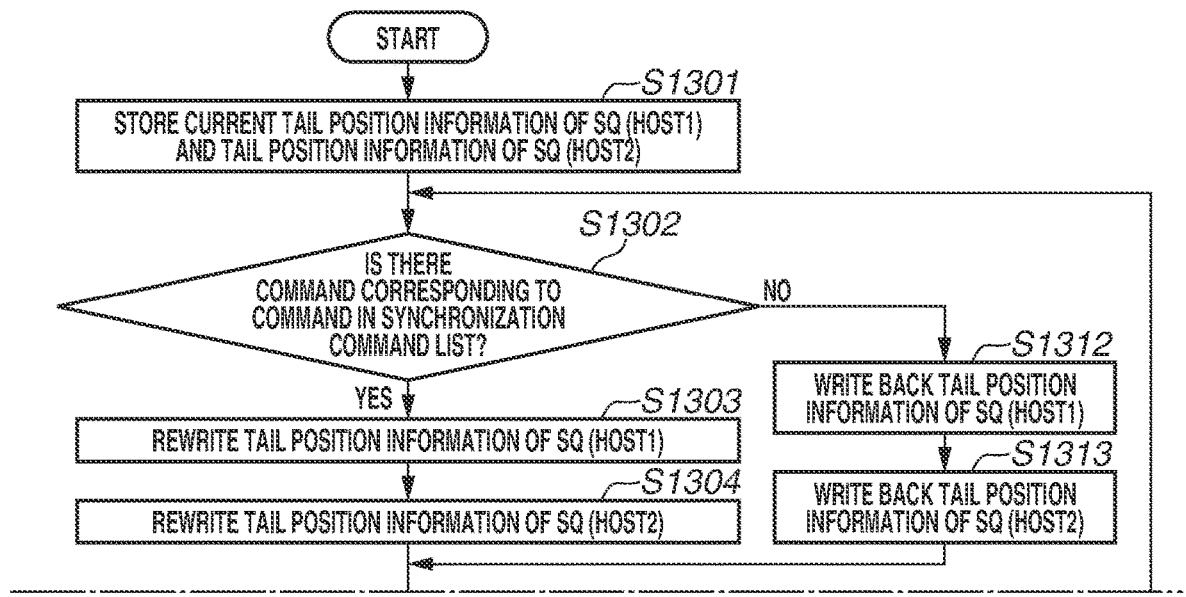

INFORMATION PROCESSING APPARATUS, CONTROL DEVICE, AND CONTROL METHOD OF CONTROL DEVICE

BACKGROUND

Field

The present disclosure relates to an information processing apparatus, a control device, and a control method of the control device.

Description of the Related Art

In information processing apparatuses such as PCs, by using a solid state drive (SSD) utilizing a nonvolatile memory, it is possible to transfer data at a higher speed than when a hard disk drive (HDD) is used. On the other hand, Serial Advanced Technology Attachment (SATA), which is an interface used in the storage devices, has not been able to exhibit transfer performance that SSDs originally have because the processing time required for data encoding at a time of transfer increases, which causes the latency to increase.

Thus, in more recent years, SSDs supporting the Non-Volatile Memory Express (NVMe) protocol, which is a new protocol that enables a direct connection to the general-purpose bus PCI-Express (PCIe) to take advantage of the high speed of SSDs, have begun to appear.

Further, as a mechanism for protecting data against a failure of a storage medium such as an HDD or SSD, there is a mirroring technique for duplicating and storing data using two storage devices. In mirroring, a bridge device is used to simultaneously record data from the host in two storage devices, so even if the data or the storage device itself is damaged, the data can be recovered by copying from the other storage device.

Japanese Patent Application Laid-Open No. 2019-075104 is a bridge device in which a first instruction group is received from an application executed on a host computer by a first interface using an NVMe-Of (or NVMe) protocol. Thereafter, a second instruction group is generated based on the first instruction group, and the second instruction group is transmitted to the storage device through the second interface using the NVMe protocol.

SUMMARY

According to an aspect of the present disclosure, an information processing apparatus including a non-volatile first storage and a non-volatile second storage, includes a reception interface configured to receive a request from a controller unit, a first memory configured to retain a request group, based on requests received by the reception interface, a second memory configured to retain a request group, based on requests received by the reception interface, and a first transmission interface configured to transmit the request group retained in the first memory to the first storage and a second transmission interface configured to transmit the request group retained in the second memory to the second storage. In the information processing apparatus, the request group transmitted by the first transmission interface and the request group transmitted by the second transmission interface are different request groups.

Further features of the present disclosure will become apparent from the following description of exemplary embodiments with reference to the attached drawings.

BRIEF DESCRIPTION OF THE DRAWINGS

FIG. 10 is a command processing list illustrating a relationship between a storage device name and a command notification.

DESCRIPTION OF THE EMBODIMENTS

Exemplary embodiments of the present disclosure will be described in detail with reference to the accompanying drawings. It is noted that the following exemplary embodiments are not intended to limit the present disclosure according to the claims, and all combinations of the features described in the exemplary embodiments are not necessarily essential to means to solve the issues.

Figure 1:
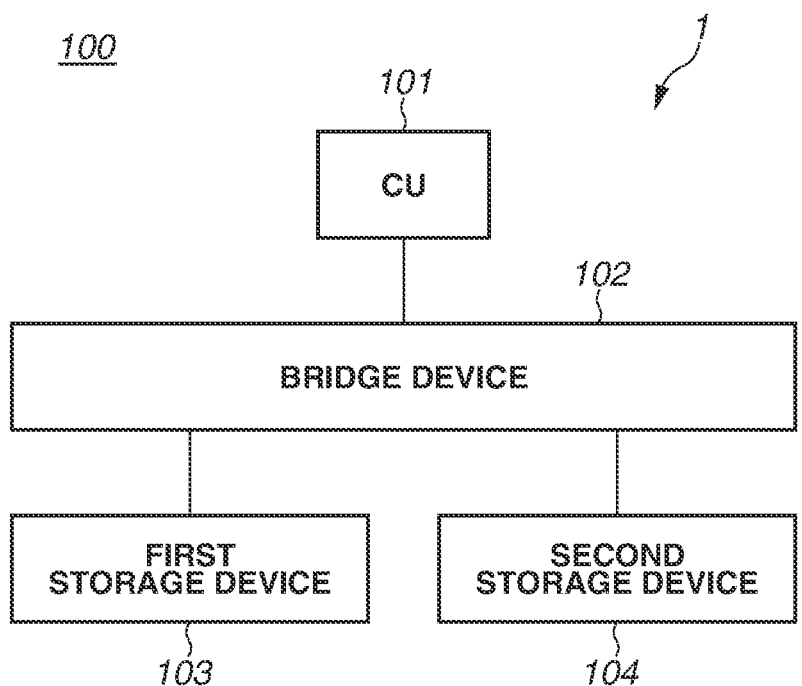
FIG. 1 is a block diagram illustrating a configuration of a mirroring system of an information processing apparatus.

FIG. 1 is a block diagram illustrating a configuration of a mirroring system of an information processing apparatus according to a first exemplary embodiment.

The information processing apparatus 100 according to the first exemplary embodiment includes a mirroring system 1.

The mirroring system 1 includes a controller unit (CU) 101, a bridge device 102, a first storage device 103, and a second storage device 104.

The CU 101 is connected with the bridge device 102 and has a function as a controller for controlling the information processing apparatus.

The bridge device 102 is connected to the CU 101 and the first storage device 103 and second storage device 104, and has a function of duplicating the data stored into the first storage device 103 from the CU 101, and storing the data in the second storage device 104.

The first storage device 103 is connected to the bridge device 102, and stores system software, user data, application data, and the like handled by the CU 101. The second storage device 104 is connected to the bridge device 102, and stores backup data obtained by duplicating the data of the first storage device 103. The first storage device 103 and the second storage device 104 are non-volatile semiconductor storage devices, such as solid state drives (SSD).

Figure 2:
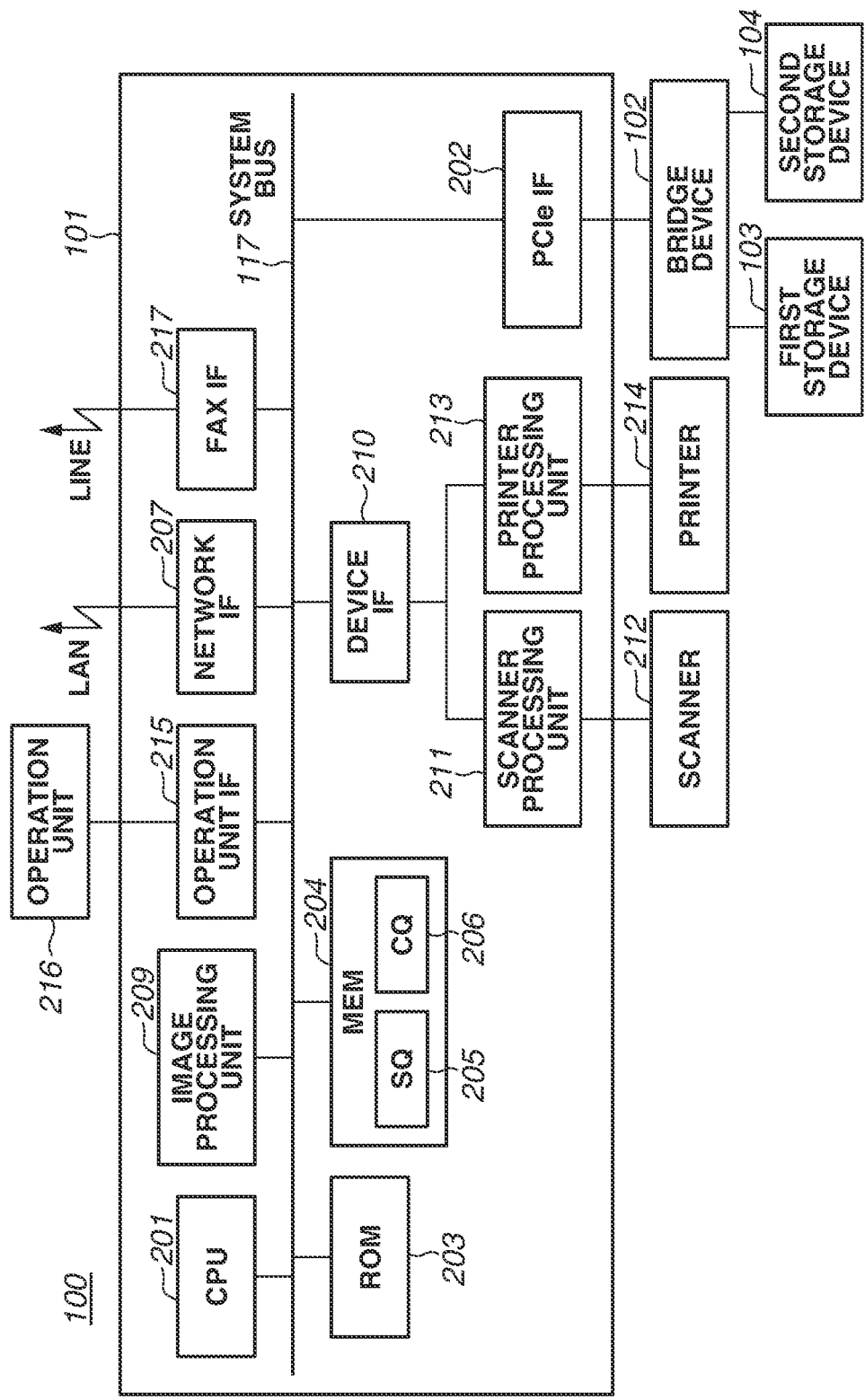
FIG. 2 is a block diagram illustrating details of a controller unit (CU).

FIG. 2 is a detailed block diagram of the CU 101.

FIG. 2 is a block diagram illustrating a hardware configuration of a controller unit of an information processing apparatus 100. In the present exemplary embodiment, an image forming apparatus is illustrated as an example of the information processing apparatus 100. The image forming apparatus is implemented as a so-called multifunctional peripheral device (MFP) in which a plurality of functions such as a scanning function and a printing function is integrated. The information processing apparatus 100 includes the CU 101 that controls the entire device, an operation unit 216, a scanner 212, and a printer 214.

The operation unit 216 includes a numeric keypad and various hardware keys for receiving an input of an instruction such as a job execution from the user, and also includes a display panel for displaying device information, job progress information, and the like to the user, or a setting screen of the functions that can be executed by the information processing apparatus 100. The scanner 212 is an image input device that optically reads an image on a set document. The printer 214 is an image output device that prints an image on a recording medium such as printing paper, based on the image data.

The operation unit 216 is connected to an operation unit interface (I/F) 215 included in the CU 101. The scanner 212 and the printer 214 are respectively connected to a scanner processing unit 211 and a printer processing unit 213 included in the CU 101. With such a configuration, the operation unit 216, the scanner 212, and the printer 214 are respectively controlled and operated by the CU 101.

The bridge device 102, the first storage device 103, and the second storage device 104 will be described in detail with reference to FIGS. 3 and 4 described below.

The CU 101 includes a central processing unit (CPU) 201 that collectively controls each block of the CU 101. The CPU 201 is connected to a memory (MEM) 204, a read only memory (ROM) 203, the operation unit I/F 215, a network I/F 207, a fax I/F 217, an image processing unit 209, and device I/F 210 via a system bus 117. The CPU 201 collectively controls access to various devices connected based on a control program or the like stored in the ROM 203, and also collectively controls various processes executed by the CU 101.

A Peripheral Component Interconnect (PCI)-Express interface (PCIe-IF) 202 is an interface of the PCI-Express standard, and exchanges data that is to be transmitted to and received from the bridge device 102, with the bridge device 102 as an Endpoint, in response to a request from the CPU 201.

The ROM 203 is a nonvolatile memory, and stores a boot program, a control program, and the like of the bridge device 102.

The MEM 204 is a general-purpose volatile random-access memory (RAM) (a memory such as a dynamic random-access memory (DRAM)) in which data is temporarily stored, and operates as a work memory of the CPU 201.

In the MEM 204, a Submission Queue (referred to as SQ) 205 and a Completion Queue (referred to as CQ) 206 used in the Non-Volatile Memory Express (NVMe) protocol are provided.

The SQ 205 is a queue of a ring buffer generated on the MEM 204, and sequentially stores NVMe commands (requests) generated by the CPU 101 for exchanging NVMe commands The CQ 206 is a queue of a ring buffer generated on the MEM 204, and sequentially stores command processing completion notifications from the bridge device 102 that is the Endpoint.

The operation unit I/F 215 is an interface for the input/output of information to/from the operation unit 216. The operation unit I/F 215 outputs display data to the operation unit 216 in response to an instruction from the CPU 201, and transmits information input by the user on the operation unit 216 to the CPU 201.

The network I/F 207 is connected to a wired or wireless medium local area network (LAN), and enables the input/output of information between the information processing apparatus 100 and the device connected via the LAN. The network I/F 207 retains the input information in a memory that temporarily stores the input information. The network I/F 107 has a configuration that supports LAN, and may have a configuration that supports near field communication for wireless communication within about several tens of centimeters, for example. In such a case, mutual communication is performed with a mobile radio terminal.

The fax I/F 217 is connected to a line and enables the input/output of information between the information processing apparatus 100 and the device connected via the line. The fax I/F 207 retains the input information in a memory that temporarily stores the input information.

The image processing unit 209 executes a general image process. For example, processes such as enlargement/reduction, rotation, conversion, or the like are executed on image data acquired from the outside via a LAN. Further, the image processing unit 209 executes a process of converting a page description language (PDL) code received via the LAN into a bitmap image. If output is performed from the printer 214 via the printer processing unit 213, the image processing unit 209 executes a process of converting the compressed and encoded image data stored in the first storage device 103, to a format that can be processed by the printer processing unit 213.

The device I/F 210 is connected with the scanner 212 and the printer 214 via the scanner processing unit 211 and the printer processing unit 213, and performs synchronous/asynchronous conversion of image data, and transmission of setting values, adjustment values, and the like. The device I/F 210 transmits the state information of the scanner 212 and the printer 214 to the CPU 201. The state information includes error information such as a jam that has occurred in the scanner 212 or the printer 214.

The scanner processing unit 211 performs various processes for scanning functions such as correction, processing, image area separation, scaling, binarization processing, and the like, on the read data that is read and input by the scanner 212.

The scanner 212 includes an automatic continuous document feeding device and a pressing plate reading device, which are not illustrated, and is capable of reading documents installed on a document glass platform, reading both sides of a plurality of documents, and the like. The scanner 212 is provided with sensors for detecting the opening/closing of the feeding device cover (not illustrated), the opening/closing of the document cover (not illustrated), the presence/absence of a document, and the document size. The detection signals of the sensors and the state information of the scanner 212 is transmitted to the CPU 201 via the scanner processing unit 211 and the device I/F 210, and the CPU 201 recognizes the state such as error occurrence or error cancellation in the scanner 212.

The printer processing unit 213 performs, on the image data to be printed out, processes corresponding to print functions such as output correction, resolution conversion, adjustment of the print position of the image, and the like corresponding to the output characteristics of the printer 214. The printer 214 incudes one or more feed cassettes (not illustrated) for storing printing paper, one or more toner trays (not illustrated) for storing toner, and a sheet feeder unit (not illustrated) capable of feeding one sheet at a time from the feed cassette. In addition, the printer 214 includes a marking unit (not illustrated) for applying toner on the fed paper, and a fixing unit (not illustrated) for fixing the toner applied by the marking unit by heat and pressure. The printer 214 is provided with sensors for detecting the opening/closing status and the remaining amount of paper in each feed cassette, the opening/closing status of the toner tray, the opening/closing of the sheet feeder unit cover (not illustrated), the presence/absence of toner, the position of paper that is being fed, and the like. The detection signals from the sensors and the state information of the printer 214 are transmitted to the CPU 201 via the printer processing unit 213 and the device I/F 210, and the CPU 201 recognizes the state such as error occurrence or error cancellation in the printer 214.

Figure 3:
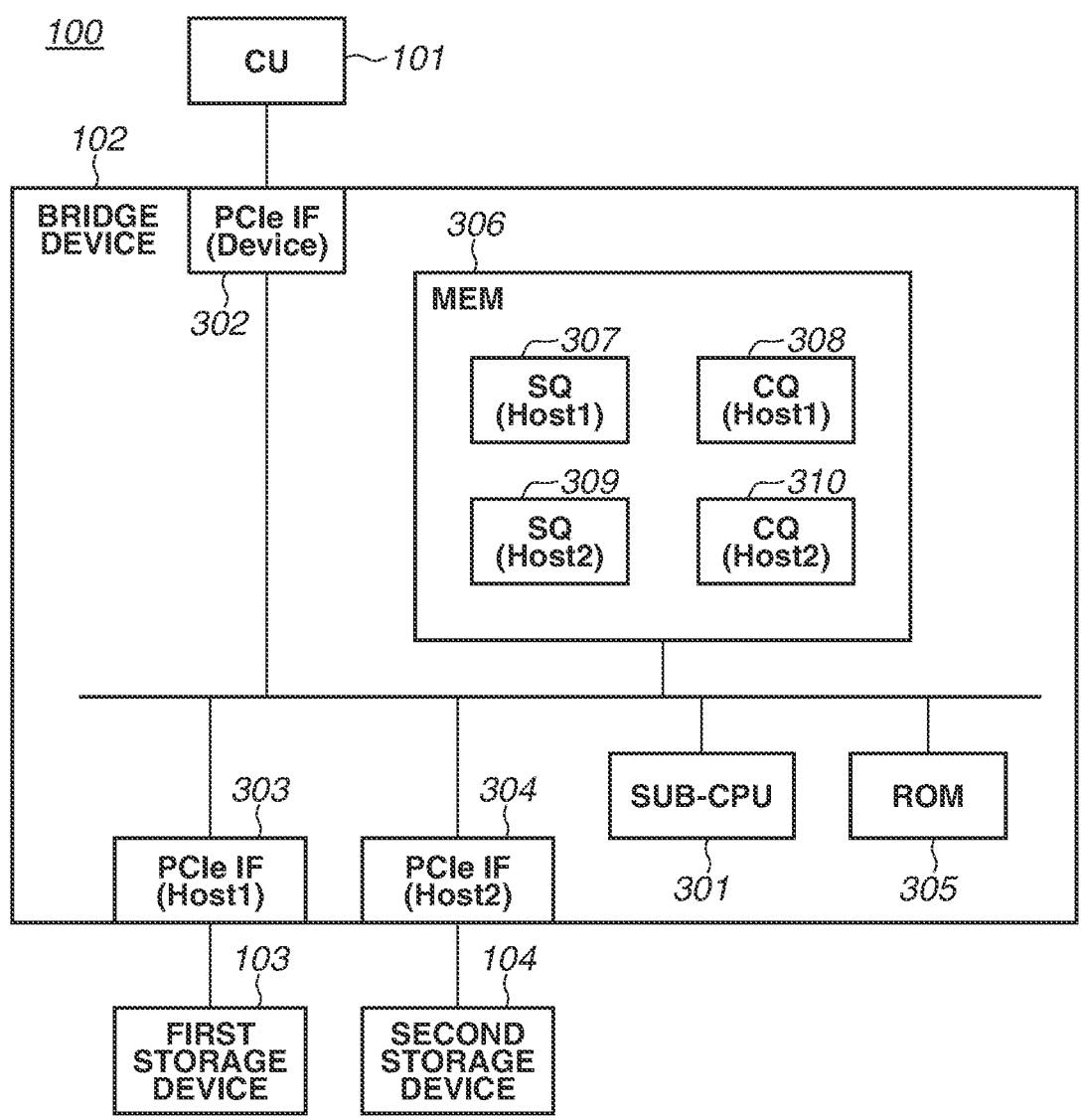
FIG. 3 is a block diagram illustrating details of a bridge device.

FIG. 3 is a detailed block diagram of the bridge device 102.

The bridge device 102 has a sub-CPU 301, PCIe-IFs 302, 303, and 304, a ROM 305, and an MEM 306. The bridge device 102 is connected to the CU 101 via the PCIe-IF 302, and is connected to the first storage device 103 and the second storage device 104 via the PCIe-IFs 303 and 304, respectively.

The sub-CPU 301 controls, based on a control program or the like stored in the ROM 305, the access between the connected CU 101 and the first storage device 103 and second storage device 104. Further, the sub-CPU 301 generates, based on a command group (request group) received from the CU 101, a command group (request group) for each storage device.

The PCIe-IF (Device) 302 exchanges the data to be transmitted to and received from the CU 101, with the CU 101 as a RootComplex. The PCIe-IF (Host 1) 303 exchanges the data to be transmitted to and received from the storage device, with the first storage device 103 as an Endpoint. The PCIe-IF (Host 2) 304 exchanges the data to be transmitted to and received from the storage device, with the second storage device 104 as an Endpoint.

The ROM 305 is a nonvolatile memory, and stores a boot program, a control program, and the like of the bridge device 102.

The MEM 306 is a general-purpose volatile RAM (memory such as DRAM) in which data is temporarily stored and operates as a work memory of the CPU 201. In the MEM 306, two SQs and two CQs (SQs 307 and 309, and CQs 308 and 310), which are used in the NVMe protocol, are provided.

The SQ 307 is a queue of a ring buffer generated on the MEM 306, and sequentially stores NVMe commands generated by the bridge device 102 for exchanging NVMe commands.

The CQ 308 is a queue of a ring buffer generated on the MEM 306, and sequentially stores command completion notifications from the storage device that is the Endpoint.

The SQ 309 and the CQ 310 are respectively similar to the SQ 307 and the CQ 308.

Figure 4:
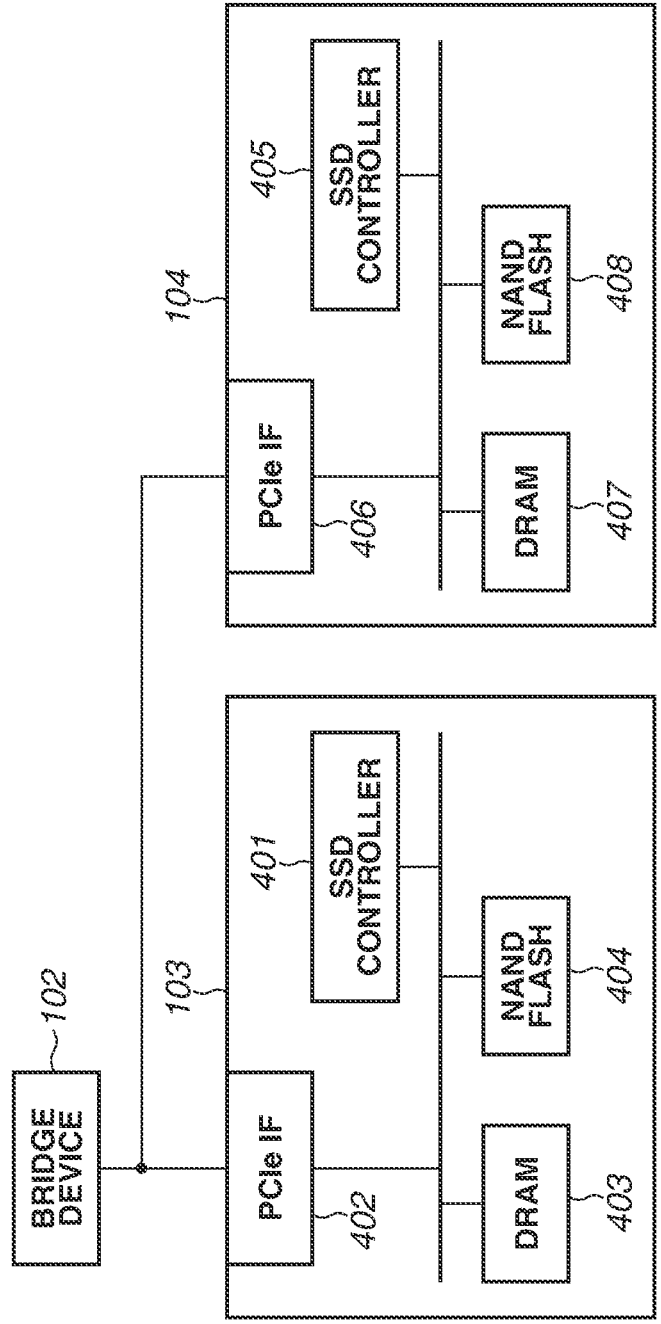
FIG. 4 is a block diagram illustrating details of a first storage device and a second storage device.

FIG. 4 is a detailed block diagram of the first storage device 103 and the second storage device 104.

The first storage device 103 includes an SSD controller 401, a PCIe-IF 402, a DRAM 403, and a NAND FLASH 404. The first storage device 103 is connected to the bridge circuit 102 via the PCIe-IF 402. The second storage device 104 has a similar configuration to the first storage device 103, and therefore, the description of components 405 to 408 of the second storage device 104 will be omitted.

The SSD controller 401 is equipped with a processor that processes firmware executed in the storage device, a DRAM controller that controls the DRAM 403, and a NAND FLASH controller that controls the NAND FLASH 404.

The PCIe-IF 402 exchanges the data to be transmitted to and received from the bridge device 102, with the bridge device 102 as a RootComplex.

The DRAM 403 is a cache memory, and temporarily retains data before writing the data to the NAND FLASH 404.

The NAND FLASH 404 is a device that actually records data, and data is read and written from and to the NAND FLASH 404. The data referred to here is, for example, a system software program, history data, image data, a table.

The same data is stored in both the first storage device 103 and the second storage device 104 when writing data, but when reading data, the data may be read from one of the storage devices. In the description below, the first storage device 103 is treated as a master storage device and the second storage device 104 is treated as a slave storage device, and data is read from the master storage device.

Figure 5:
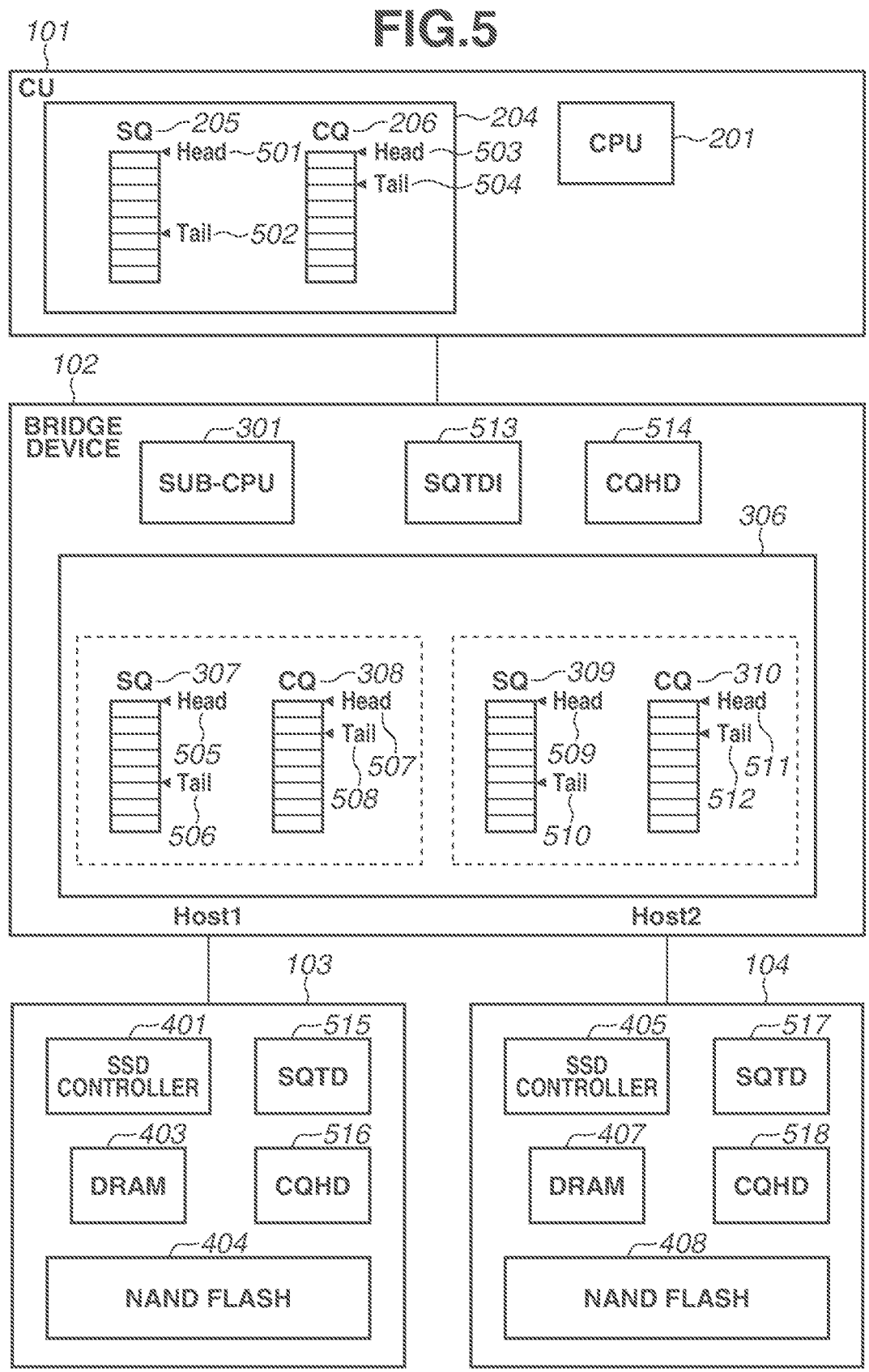
FIG. 5 is a block diagram illustrating an operation of the mirroring system.

An operation of the mirroring system 1 will be described in detail with reference to FIG. 5 illustrating an operation of the mirroring system.

First, a configuration of the MEM 204 of the CU 101 will be described. The SQ 205 manages commands by using a Head pointer 501 as the head element of the queue, and a Tail pointer 502 as the tail element of the queue. The CQ 206 manages command responses by using a Head pointer 503 as the head element of the queue, and a Tail pointer 504 as the tail element of the queue. In the SQ 205 and the CQ 206, commands are stored in a queue sandwiched between the Head pointer 501 (503) and the Tail pointer 502 (504). In other words, if the Head pointer and the Tail pointer are at the same position, it indicates that the queue is empty.

Next, a configuration of the bridge device 102 will be described.

The Submission Queue Tail Doorbell (SQTD) 513 is a register that stores the position information of the Tail pointer 502 of the SQ 205 received from the CU 101, and notifies the sub-CPU 301 of the stored position information. The Completion Queue Head Doorbell (CQHD) 514 is a register for updating and notifying the position information of the Head pointer 503 of the CQ 206. With this register, the CPU 201 in the CU 101 receives the command processing completion notification from the bridge device 102, and notifies that checking the contents of the information stored in the CQ 206 has finished. The SQTD 513 and the CQHD 514 may be included in the PCIe-IF 302 illustrated in FIG. 3, or may be included as registers constituting the SQTD 513 and the CQHD 514 inside the bridge device 102.

The SQ 307 of the MEM 306 receives the information of the Tail pointer 502 from the SQ 205 of the CU 101, and acquires and stores the command stored in the SQ 205. Then, the SQ 307 manages the received information by using the Head pointer 505 as the head element of the queue and the Tail pointer 506 as the tail element of the queue.

After storing the command, the SQ 307 notifies the SQTD 515 of the first storage device 103 about the information of the Tail pointer 506.

The CQ 308 is managed by using the Head pointer 507 as the head element of the queue, and the Tail pointer 508 as the tail element of the queue. Then, the CQ 308 stores the command processing completion notification from the first storage device 103. When the processing of the command processing completion notification stored in the CQ 308 is completed in the bridge device 102, the position information of the Head pointer 507 of the CQ 308 is updated and notification is sent to the CQHD 516.

The SQ 309 of the MEM 306 receives the information of the Tail pointer 502 from the SQ 205 of the CU 101, and acquires and stores the command stored in the SQ 205. Then, the SQ 309 manages the received information by using the Head pointer 509 as the head element of the queue and the Tail pointer 510 as the tail element of the queue.

After storing the command, the SQ 309 notifies the SQTD 517 of the second storage device 104 about the information of the Tail pointer 510.

The CQ 310 is managed by using the Head pointer 511 as the head element of the queue, and the Tail pointer 512 as the tail element of the queue. Then, the CQ 310 stores the command processing completion notification from the second storage device 104. When the processing of the command processing completion notification stored in the CQ 310 is completed in the bridge device 102, the position information of the Head pointer 511 of the CQ 310 is updated, and notification is sent to the CQHD 518.

When the bridge device 102 finishes processing both the command processing completion notification from the first storage device 103 and the command processing completion notification from the second storage device 104, the command processing completion notification is sent to and stored in the CQ 206.

Next, a configuration of the first storage device 103 will be described.

The SQTD 515 and the CQHD 516 are registers in the first storage device 103. The SQTD 515 receives the information of the Tail pointer 506 from the SQ 307 of the MEM 306.

The SSD controller 401 uses the received information of the Tail pointer 506 to acquire the commands from the Head pointer 505 to the Tail pointer 506 of the SQ 307, and sequentially executes processing of the commands When the SSD controller 401 executes the command processing, the SSD controller 401 transmits the command processing result, as a response, to the CQ 308, and stores the result.

When checking of the result content of the command processing result response stored in the CQ 308 is completed in the bridge device 102, the position information of the Head pointer 507 of the CQ 308 is updated and notification is sent to the CQHD 516.

Next, a configuration of the second storage device 104 will be described.

The SQTD 517 and the CQHD 518 are registers in the second storage device 104. The SQTD 517 receives the information of the Tail pointer 510 from the SQ 309 of the MEM 306.

The SSD controller 405 uses the received information of the Tail pointer 510 to acquire the commands from the Head pointer 509 to the Tail pointer 510 of the SQ 309, and sequentially executes processing of the commands When the SSD controller 405 executes the command processing, the SSD controller 405 transmits the command processing result, as a response, to the CQ 310, and stores the result therein.

When checking of the result content of the command processing result response stored in the CQ 310 is completed in the bridge device 102, the position information of the Head pointer 511 of the CQ 310 is updated and notification is sent to the CQHD 518. The sending and receiving of commands in the mirroring system 1 illustrated in FIG. 5 will be described with reference to specific examples.

The CPU 201 of the CU 101 creates an NVMe command to perform IO access to the first storage device 103 by the NVMe protocol.

A situation where the CPU 201 performs IO access is, for example, a case where data generated by reading of a document by the scanner 212 is stored in the first storage device 103, or a case where stored data is read and printed. Further, for example, a case where PDL data is received via a network IF, the data is stored in the first storage device 103, and the stored data is read and printed, is included. In addition, for example, a case where facsimile data is received via a fax IF, the data is stored in the first storage device 103, and the stored data is read and printed, is included. In such cases, it is necessary to write the data to the storage device or read the data from the storage device, and therefore, the CPU 201 executes IO access to the first storage device 103 by the NVMe protocol. In the present exemplary embodiment, the situations where the CPU 201 performs IO access are not limited to the above examples.

When the CPU 201 creates NVMe commands, the CPU 201 sequentially stores the NVMe commands in the SQ 205 on the MEM 204. Each time an NVMe command is stored, the Tail pointer 502 of the SQ 205 is updated, and the tail position information of the NVMe commands stored in the SQ 205 is updated.

When the Tail pointer 502 is updated, the CU 101 notifies the bridge device 102 that a new NVMe command has been stored. Thus, the SQTD 513 in the bridge device 102 that receives the notification writes the value of the last Tail point 502 of the SQ 205.

The bridge device 102 determines that a new NVMe command is stored on the CU 101 from the fact that the value of the SQTD 513 is updated.

When the value of the SQTD 513 is updated, the bridge device 102 sequentially extracts the NVMe commands arranged at the respective pointer positions from the position of the Head pointer 501 to the position of the Tail pointer 502 in the SQ 205. More specifically, by sending a command for reading an NVMe command, the bridge device 102 causes the CU 101 to transmit the NVMe command The extracted NVMe commands are stored in the SQ 307 (Host 1) and the SQ 309 (Host 2) of the MEM 306 in the bridge device 102.

Next, the command processing for storing the NVMe commands in the SQ 307 and SQ 309 in the bridge device 102 will be described in detail with reference to the flowchart in FIG. 6.

The position information is updated when the SQTD 513 of the bridge device 102 receives a position information notification (hereinafter, referred to as a Doorbell notification) of the Tail pointer 502 of the SQ 205 from the CU 101.

After updating the position information, the bridge device 102 starts acquiring the NVMe commands, and stores the new NVMe commands in the SQ 307 and the SQ 309 in the bridge device 102. FIG. 6 is a flowchart illustrating the flow.

Figure 6:
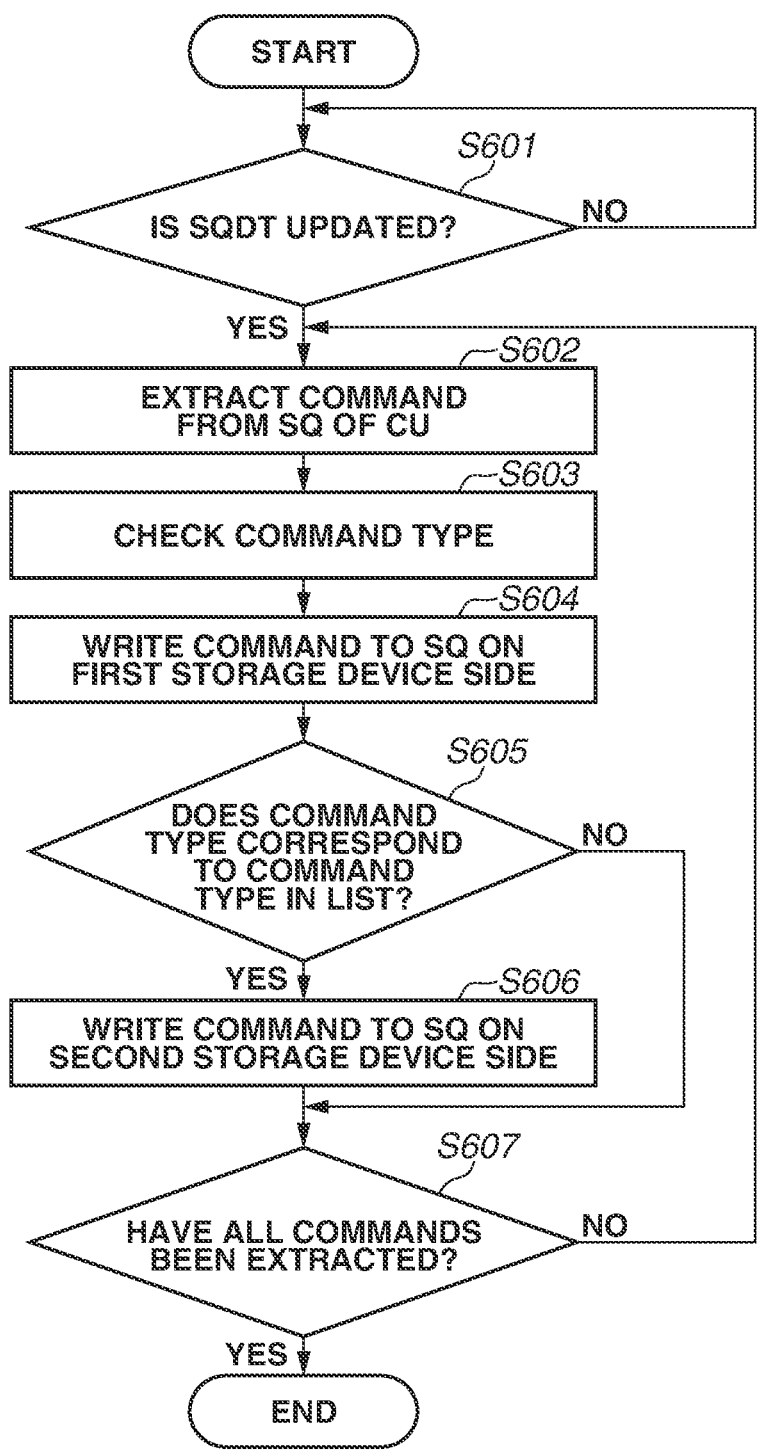
FIG. 6 is a flowchart illustrating a command process for storing a Non-Volatile Memory Express (NVMe) command

The processing in FIG. 6 is executed by the sub-CPU 301 and starts when the SQTD 513 of the bridge device 102 receives the Doorbell notification of the SQ 205 of the CU 101.

In step S601, the sub-CPU 301 checks whether the value of the SQTD 513 is updated. In this way, the sub-CPU 301 checks whether a new NVMe command is stored in the SQ 205 of the CU 101.

If the value of the SQTD 513 is updated (YES in step S601), the processing proceeds to step S602. If the value of the SQTD 513 is not updated (NO in step S601), the processing remains at step S601.

In step S602, one command is extracted when the sub-CPU 301 reads the NVMe commands prepared on the CU 101 from the SQ 205, and the processing proceeds to step S603.

In step S603, the sub-CPU 301 checks the command type (Write, Read, and the like) of the extracted command, and the processing proceeds to step S604.

Figure 7:
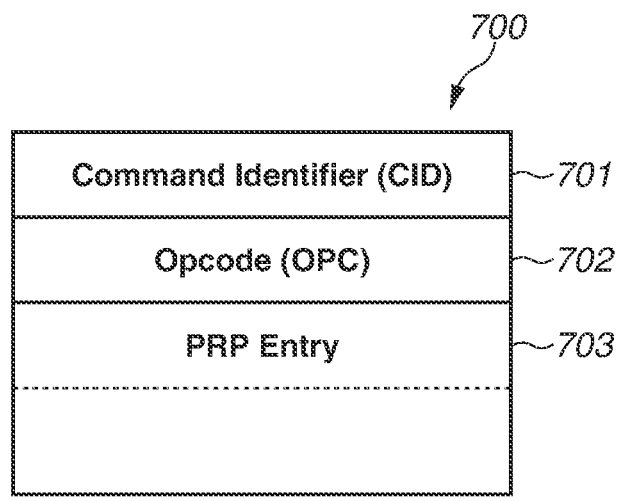
FIG. 7 is a diagram illustrating a format of the NVMe command

The checking of the command type is performed by checking the information in the NVMe command 700. The format of the NVMe command 700 and the information contained in the format of the NVMe command 700 will be specifically described with reference to FIG. 7. The NVMe command 700 has the fields of a Command Identifier (hereinafter, referred to as a CID) 701, an Opcode 702 (hereinafter, referred to as an OPC), and a Physical Region Page (PRP) Entry 703.

The CID 701 is a unique number added to the command. The OPC 702 is an identifier indicating the type of the command, and is an identifier such as Write or Read. The RPR Entry 703 stores information indicating an address of a transfer source or an address of a transfer destination.

Referring back to FIG. 6, in step S604, the sub-CPU 301 writes the extracted NVMe command to the SQ 307 on the first storage device 103 side, and the processing proceeds to step S605.

In step S605, the sub-CPU 301 determines whether to write the extracted command to the SQ 309 on the second storage device 104 side. In this case, the command list 800 that can be processed by the second storage device 104 illustrated in FIG. 8 and the command type checked in step S603 are compared. In step S605, if the sub-CPU 301 determines that the command type corresponds to a command type 801 in the list (YES in step S605), the processing proceeds to step S606. If not (NO in step S605), the processing proceeds to step S607.

Figure 8:
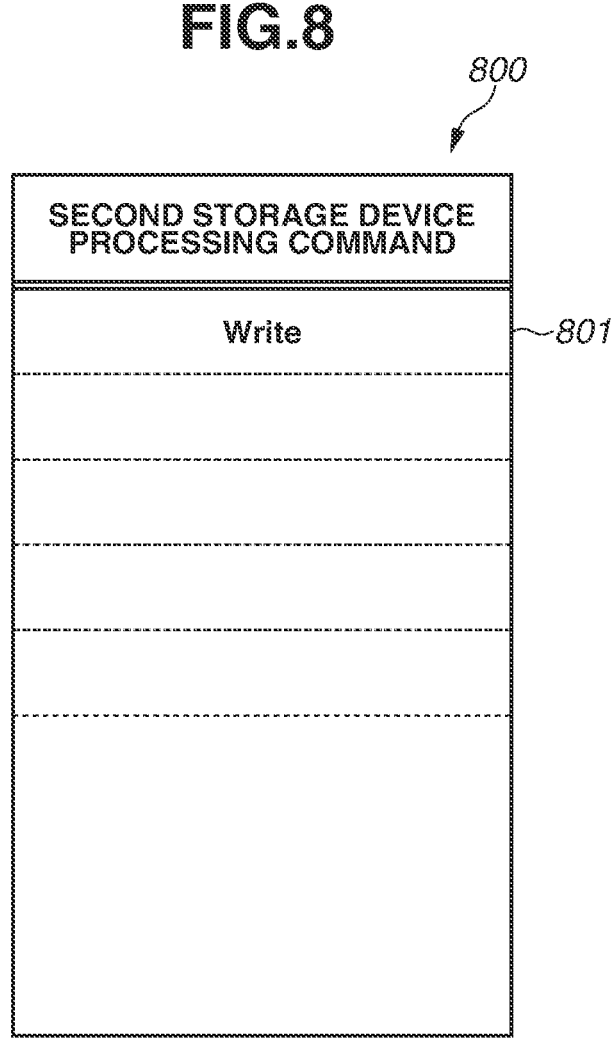
FIG. 8 is a command list illustrating commands that can be processed by the second storage device.

According to the command list 800 of FIG. 8, the second storage device 104 can process the Write command, for example. Thus, in the example, if the command type checked in step S603 is Write, the processing proceeds to step S606, and if not, the processing proceeds to step S607.

In this case, the reason why the command list 800 contains only Write command is that in the mirroring system 1, data may be read only from the master storage device (first storage device 103). With such a configuration, it is possible to omit unnecessary processing of reading data from the slave (second storage device 104).

In step S606, the sub-CPU 301 writes the extracted command to the SQ 309 on the second storage device 104 side, and the processing proceeds to step S607.

In step S607, it is determined whether the bridge device 102 has finished extracting all NVMe commands prepared in the SQ 205 on the CU 101. The pointer for the SQ 205 referred to when a command is extracted and the value of the SQTD 513 are checked, and if the values are the same, it can be determined that the last command stored in the SQ 205 has been extracted. If all commands have been extracted (YES in step S607), the processing ends, and if a command is still remaining (NO in step S607), the processing returns to step S602, and extraction of command is performed again.

Although the command list 800 of FIG. 8 is a list including commands that can be processed, the command list 800 may be a command list that includes predetermined commands that cannot be processed. In such a case, the commands described in the command list 800 will be the Read command instead of the Write command Further, when the command list includes commands that cannot be processed, the YES and NO in step S605 will be reversed.

In step S602, a configuration in which commands are extracted one by one over a plurality of times was described, however, all commands may be extracted at one time and processed, or a plurality of commands may be extracted over a plurality of times.

Figure 9:
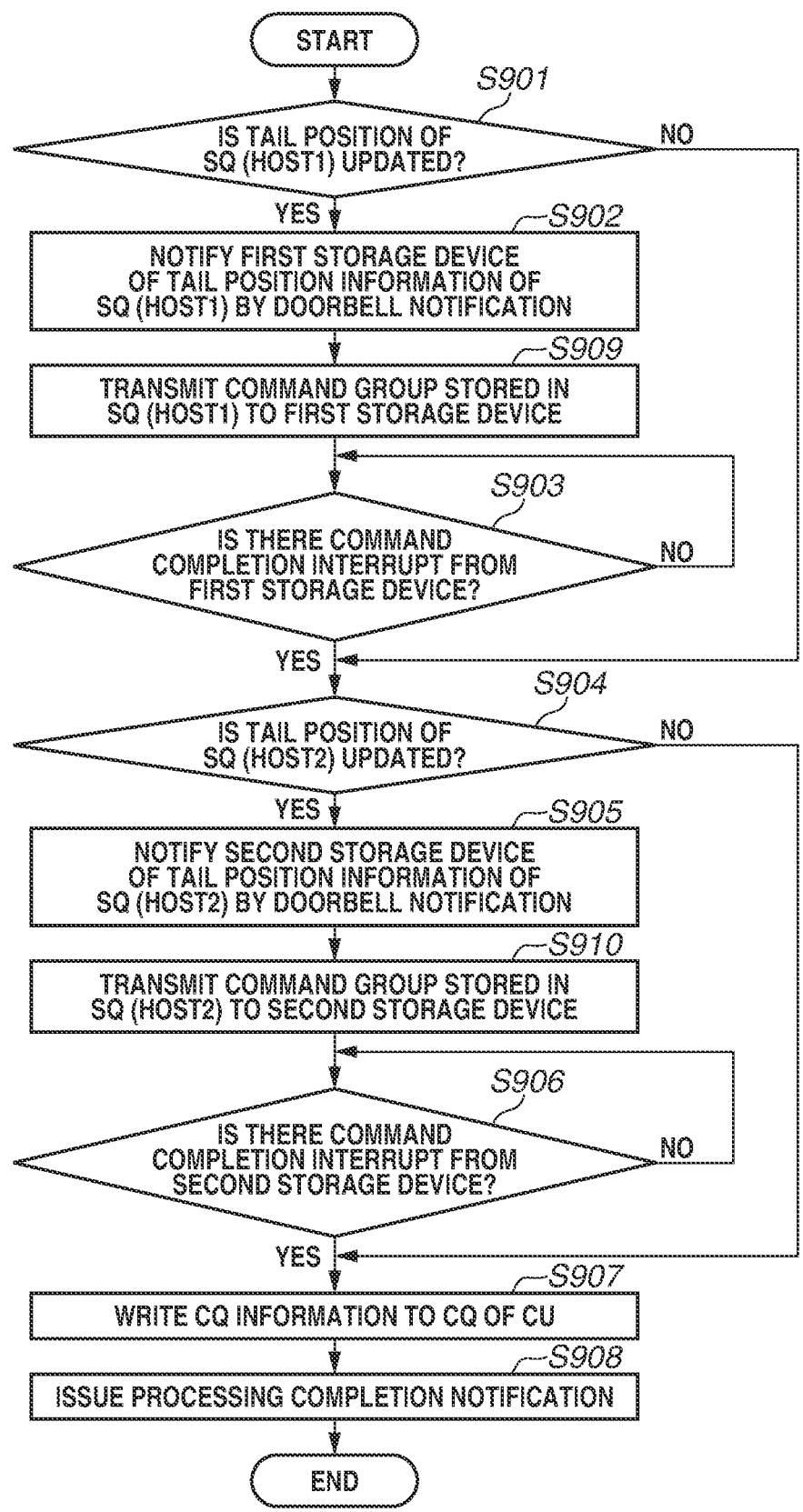
FIG. 9 is a flowchart illustrating a command process to be performed after the NVMe command is stored.

The command processing after the NVMe commands are stored in the SQ 307 and the SQ 309 of the bridge device 102 will be described with reference to the flowchart in FIG. 9.

In step S901, the sub-CPU 301 checks whether a new NVMe command is stored in the SQ (Host 1) 307 in the bridge device 102.

More specifically, the sub-CPU 301 checks the difference between the Head pointer 505 and the Tail pointer 506 of the SQ (Host 1) 307. If there is a difference (YES in step S901), it means that a new NVMe command is stored, and the processing proceeds to step S902. If there is no difference (NO in step S901), it means that no new NVMe command is stored, and the processing proceeds to step S904.

In step S902, the sub-CPU 301 notifies the first storage device 103 that a new NVMe command is stored in the SQ (Host 1) 307 in the bridge device 102. The sub-CPU 301 uses the Doorbell notification to write the position information of the Tail pointer 506 of the SQ (Host 1) 307 to the SQTD 515 of the first storage device 103. Further, to store that an NVMe command processing request is made to the first storage device 103, the sub-CPU 301 turns ON (sets to 1) the first storage device notification flag 1003 of the command processing list 1000 illustrated in FIG. 10.

Now, the command processing list 1000 will be described. The command processing list illustrated in FIG. 10 includes a command notification flag 1002 indicating the relationship between a storage device name 1001 indicating each storage device and a command notification.

For example, if a notification about command processing has been made to the second storage device, the second storage device notification flag 1004 becomes ON (1), and if a notification about command processing has not been made, the second storage device notification flag 1004 becomes OFF (0).

In response to the updating of the value of the SQTD 515 of the first storage device 103, in step S909, the SSD controller 401 of the first storage device 103 extracts an NVMe command from the SQ 307. At this time, the sub-CPU 301 receives a command transmission request from the first storage device 103, and transmits the NVMe commands retained in the SQ 307 (transmission process). At this time, the sub-CPU 301 may transmit a plurality of commands at a time, or may transmit the commands one by one. The SSD controller 401 performs the processing according to the content of the extracted command. Each time a command processing is completed, the SSD controller 401 writes the command processing completion to the CQ (Host 1) 308 on the first storage device 103 side in the bridge device 102. When the processing of all commands is completed, the first storage device 103 notifies the bridge device 102 of the fact by an interrupt.

In step S903, the sub-CPU 301 determines whether the NVMe command processing in the first storage device 103 is completed. If the first storage device notification flag 1003 in the command processing list 1000 is OFF (set to 0), the processing of step S903 is skipped and the processing proceeds to step S904. The sub-CPU 301 checks whether the NVMe command processing completion interrupt is issued from the first storage device 103. If a completion interrupt is issued by an interrupt (YES in step S903), the first storage device notification flag in the command processing list is turned OFF and the processing proceeds to step S904. If a completion interrupt is not issued (NO in step S903), the processing remains at step S903, and the sub-CPU wait for the completion of command processing in the first storage device 103.

In step S904, the sub-CPU 301 checks whether a new NVMe command is stored in the SQ (Host 2) 309 in the bridge device 102. The sub-CPU 301 checks a difference between the Head pointer 509 and the Tail pointer 510 of the SQ (Host 2) 309, and if there is a difference, it means that a new NVMe command is stored. If a new NVMe command has been stored (YES in step S904), the processing proceeds to step S905, and if a new NVMe command has not been stored (NO in step S904), the processing proceeds to step S907.

In step S905, the sub-CPU 301 notifies the second storage device 104 that a new NVMe command is stored in the SQ (Host 2) 309 in the bridge device 102. The sub-CPU 301 uses the Doorbell notification to write the position information of the Tail pointer 510 of the SQ (Host 2) 309 to the SQTD 517 of the second storage device 104. Further, to store that an NVMe command processing request is made to the second storage device 104, the sub-CPU 301 turns ON (sets to 1) the second storage device notification flag 1004 of the command processing list 1000 illustrated in FIG. 10.

In response to the updating of the value of the SQTD 517 of the second storage device 104, in step S910, the SSD controller 405 of the second storage device 104 extracts an NVMe command from the SQ 309. At this time, the sub-CPU 301 receives a command transmission request from the second storage device 104, and transmits the NVMe commands retained in the SQ 309 (transmission process). The sub-CPU 301 may transmit a plurality of commands at a time, or may transmit the commands one by one.

The SSD controller 405 performs the processing according to the contents of the extracted commands, and each time a command processing is completed, the SSD controller 405 writes the command processing completion to the CQ (Host 2) 310 on the second storage device 104 side in the bridge device 102. When the processing of all commands is completed, the second storage device 104 notifies the bridge device 102 of the fact by an interrupt.

In step S906, the sub-CPU 301 determines whether the NVMe command processing in the second storage device 104 is completed. If the second storage device notification flag 1004 in the command processing list 1000 is OFF (set to 0), the processing of step S906 is skipped and the processing proceeds to step S907.

The sub-CPU 301 checks whether the NVMe command processing completion interrupt is issued from the second storage device 104. If a completion interrupt is issued by an interrupt (YES in step S906), the second storage device notification flag in the command processing list is turned OFF and the processing proceeds to step S907. If a completion interrupt is not issued (NO in step S906), the processing remains at step S906, and the sub-CPU 301 waits for the completion of command processing in the second storage device 104 is awaited.

In step S907, to store in the CU 101 the command processing completion information of the first storage device 103, the sub-CPU 301 sequentially writes in the CQ 206 of the CU 101 the command processing completion information stored in the CQ (Host 1) 308 of the bridge device 102.

In step S908, the sub-CPU 301 notifies the CU 101 that the command processing for the first storage device 103 is completed and all completion notifications have been written to the CQ 206 of the CU 101. The sub-CPU 301 uses an interrupt to notify the CU 101 that the writing of the entire command completion information of the completed command processing in the CQ 206 is completed.

The present exemplary embodiment describes a mirroring system in which a command group on the CU 101 is generated as a new command group to be used by the first storage device 103 and the second storage device 104 via the bridge device 102, and each storage device is notified. In the mirroring system according to the present exemplary embodiment, the command group for the first storage device and the command group for the second storage device can be provided as command groups corresponding to the storage device. More specifically, by using the second storage device processing command list 800, it is possible to set whether to process various commands of the command groups prepared on the CU 101 in both the first storage device 103 and the second storage device 104, or to process the various commands only in the first storage device 103.

With the above-described configuration, by generating an instruction for the storage device for each storage device in the bridge device, it is possible to provide a mirroring system in which each storage device can execute different instructions. For example, it is possible to execute reading commands such as the Read command only in the first storage device 103 that is the master side of the mirroring system.

In the first exemplary embodiment, a mirroring system having a configuration in which a new command group generated by the bridge device 102 is extracted by the SSD controller of each storage device, and each command is processed at the timing corresponding to each storage device was described.

In a second exemplary embodiment, a description is given of a method by which, to synchronize command processing timings of the first storage device 103 and the second storage device 104, after the generation of a command group by the bridge device 102, the command group is divided based on a specific command type, and the command groups are notified to the storage device in divided unit.

Figure 11:
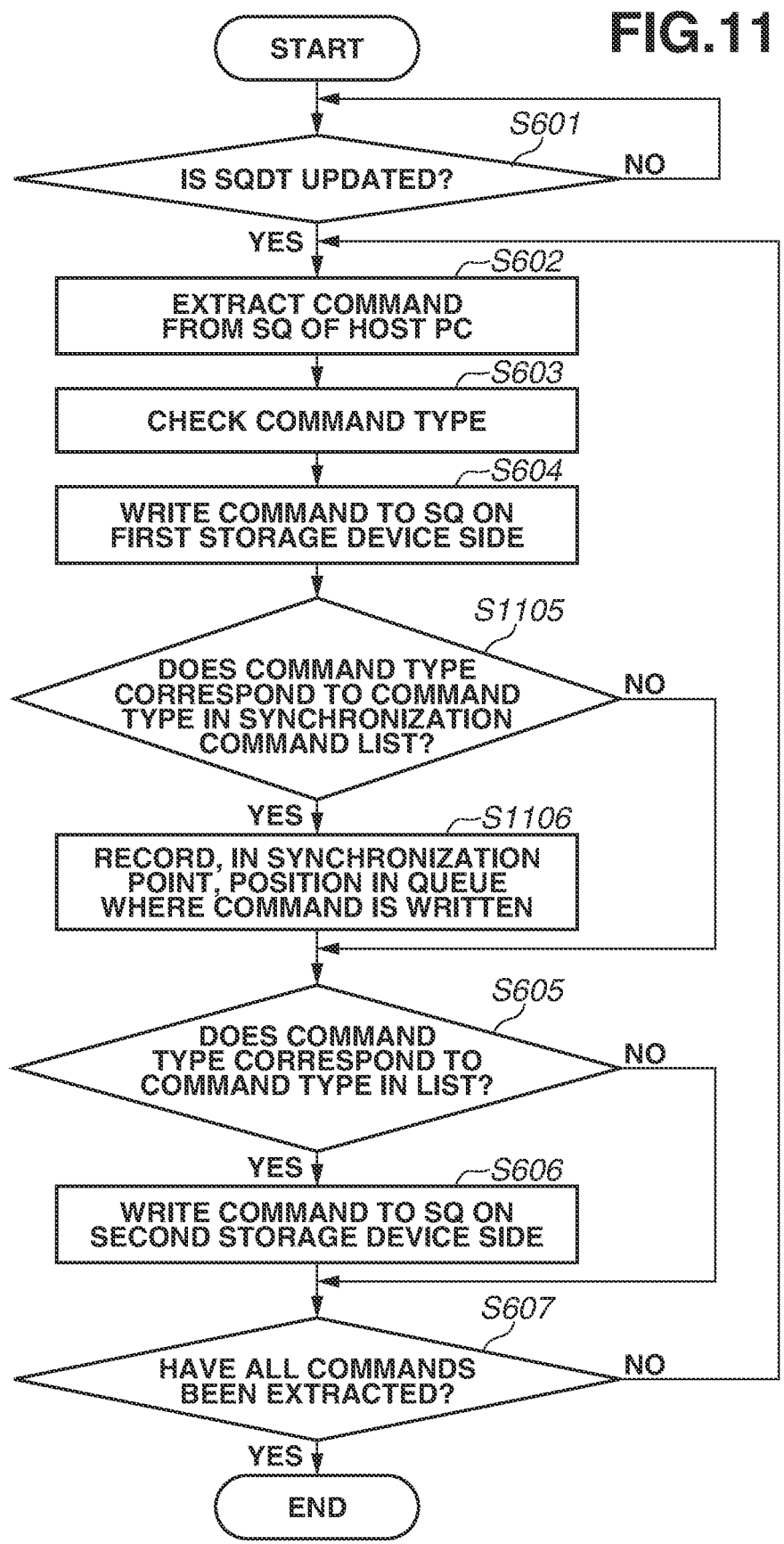
FIG. 11 is a flowchart illustrating a command process for storing an NVMe command.

A flow of the second exemplary embodiment in which the CU 101 prepares the NVMe commands, and thereafter, notifies the bridge device 102, and causes the bridge device 102 to extract the commands, will be described in the second exemplary embodiment. In the present exemplary embodiment, the differences from FIG. 6 of the first exemplary embodiment will be described with reference to FIG. 11. The same steps are assigned the same numbers and the description thereof is omitted.

In step S604, the sub-CPU 301 writes the extracted NVMe command to the SQ 307 on the first storage device 103 side. Then, the processing proceeds to step S1105. In step S1105, the sub-CPU 301 determines whether the command corresponds to a command type 1201 in the synchronization command list 1200.

Figure 12:
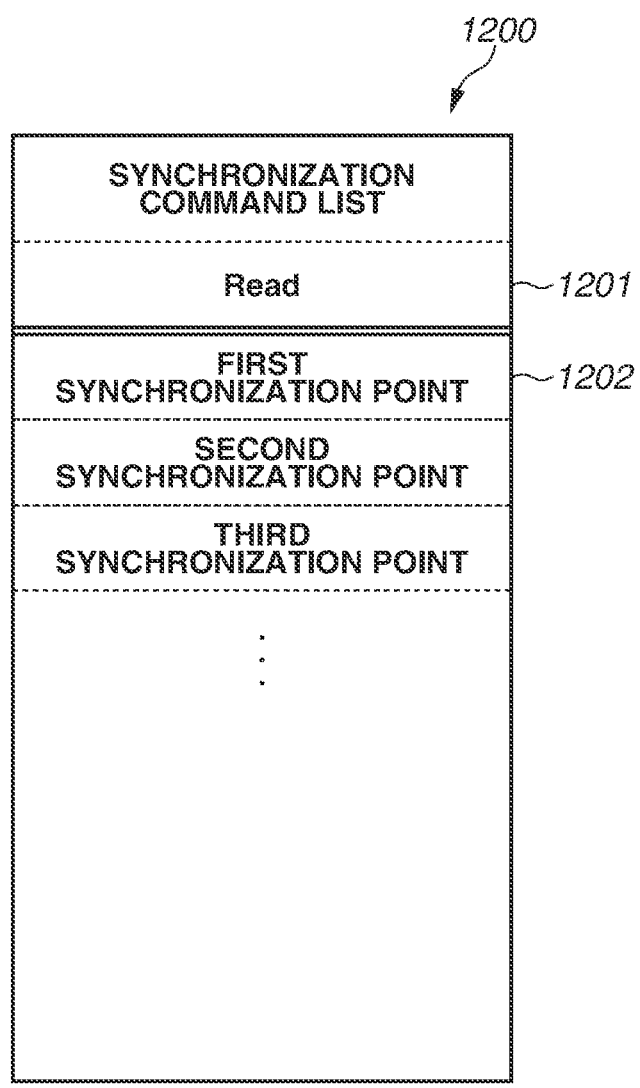
FIG. 12 is a synchronization command list illustrating a command type for synchronizing timings and a storage destination of the command type.

Here, the synchronization command list 1200 will be described. The synchronization command list 1200 illustrated in FIG. 12 consists of a command type 1201 with which the timings are to be synchronized, and a synchronization point 1202 that indicates where the command of the command type is stored in the queue.

The command type 1201 indicates the type of the commands with which the timings of the first storage device 103 and the second storage device 104 are to be synchronized. In this case, a method of synchronizing the timings with the Read command is described, but the command type is not limited to just one type and there may be multiple command types.

The synchronization points 1202 sequentially, from the top of the list, records positions in the queue where the commands with which the timings are to be synchronized, as the command position information of the queue.

Referring back to FIG. 11, in step S1105, if the sub-CPU 301 determines that the command type corresponds to the command type 1201 in the list (YES in step S1105), the processing proceeds to step S1106, and if not (NO in step S1105), the processing proceeds to step S607. In step S1106, the sub-CPU 301 performs a process of recording, in the synchronization point 1202, the position in the queue where the command is written. After the completion of the processing in step S1106, the processing proceeds to step S606. The description of steps S605 to S607 is made with reference to FIG. 6, and is therefore, omitted here.

Figure 13B:
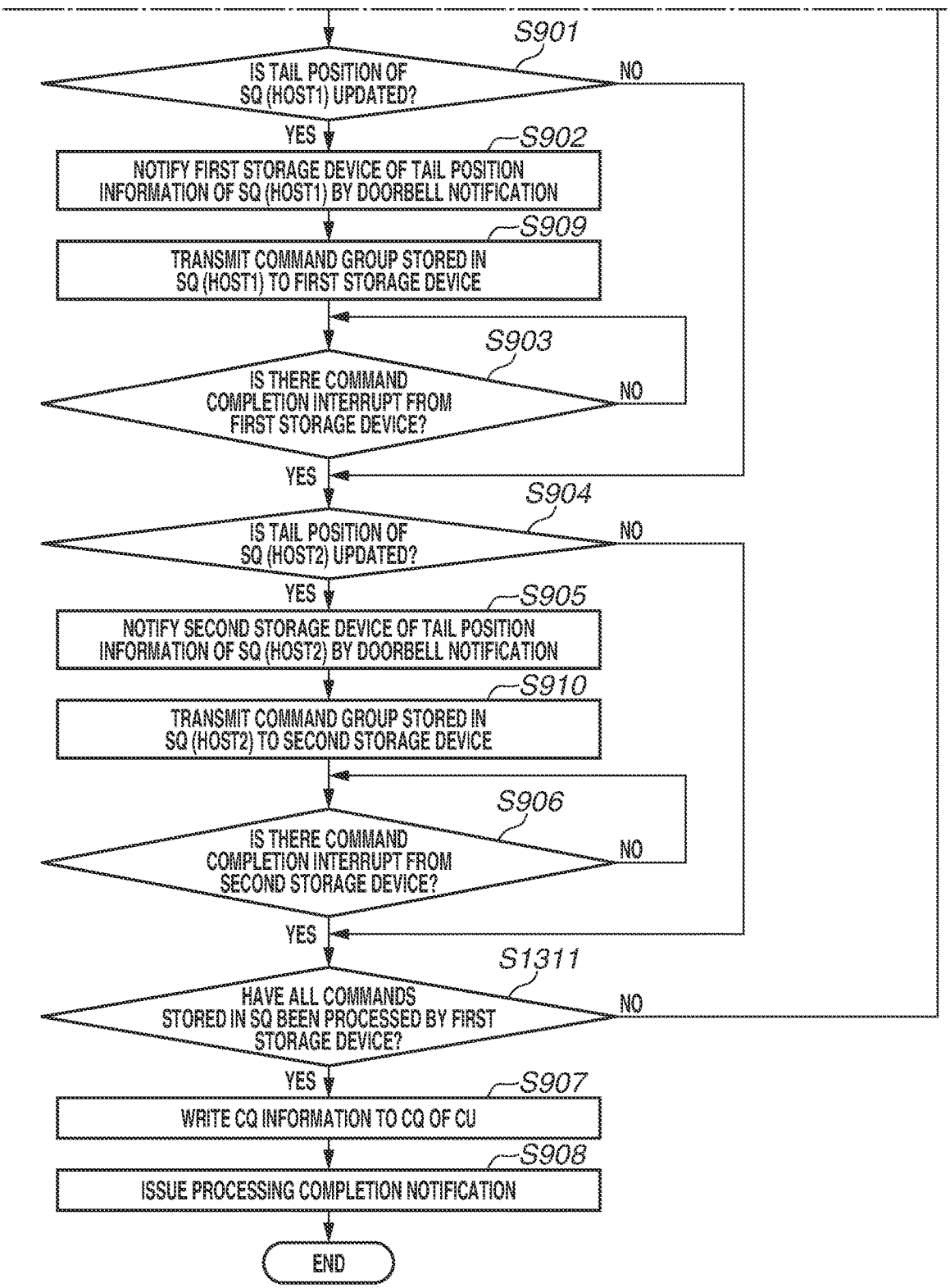
FIG. 13 (consisting of FIGS. 13A and 13B) is a flowchart illustrating a command process performed after the NVMe command is stored.

The command processing after the commands are stored in the SQ 307 and the SQ 309 of the bridge device 102 will be described with reference to the flowchart in FIG. 13. The same configurations as those in FIG. 9 of the first exemplary embodiment are assigned the same numbers and the description thereof is omitted.

In step S1301, the sub-CPU 301 stores, in the MEM 306, the current position information of the Tail pointer 506 of the SQ 307 and the current position information of the Tail pointer 510 of the SQ 309, as the current SQ-Tail information (not illustrated).

In step S1302, the sub-CPU 301 determines whether the command with which the timings are to be synchronized are present in the command group. The sub-CPU 301 checks whether the NVMe command with which the timings are to be synchronized is included in the NVMe commands stored in the SQ 307 by referring to the synchronization command list 1200. In step S1302, if the command with which the timings are to be synchronized is not included (NO in step S1302), the processing proceeds to step S1312.

In step S1312, the sub-CPU 301 writes back the current Tail pointer 506 to the position information of the original Tail pointer when the command is stored in the SQ 307 of the bridge device 102.

In step S1313, the sub-CPU 301 writes back the current Tail pointer 510 to the position information of the original Tail pointer when the command is stored in the SQ 309 of the bridge device 102. After the completion of the processing in step S1313, the processing proceeds to step S905.

Step S1302 will be further described. In step S1302, if the command with which the timings are to be synchronized is included (YES in step S1302), the processing proceeds to step S1303.

In step S1303, the sub-CPU 301 rewrites the position information of the Tail pointer 506 of the SQ 307, based on the information of the command stored in the synchronization command list 1200 with which the timings are to be synchronized.

In step S1304, the sub-CPU 301 determines the number of commands to be processed from the position information of the Tail pointer 506 rewritten in step S1303, and rewrites the position information of the Tail pointer 510 of the SQ 309. After the completion of the processing in step S1304, the processing proceeds to step S905.

According to the configuration in steps S1303 and S1304, by rewriting the position information of the Tail pointers of the SQ 307 and the SQ 309, it is possible to send and receive commands to and from each storage device, with the command group up to the rewritten Tail pointer as one unit.

In step S1311, it is determined whether all the NVMe commands stored in the SQ 307 have been processed by the first storage device 103. More specifically, the sub-CPU 301 checks whether the Tail pointer 506 of the SQ 307 matches the position information of the original Tail pointer stored in step S1301. If, upon checking the two pieces of position information, the sub-CPU 301 determines that the information are not matched (NO in step S1311), the processing returns to step S1302. If, upon checking the two pieces of position information, the sub-CPU 301 determines that the information are matched (YES in step S1311), the process proceeds to step S907. The state in which the two position information are checked and found to be matched is a state in which the processing of all commands is completed.

If the two pieces of position information are checked and do not match, the processing returns to step S1302 to continue command processing, and if the two pieces of position information are matched, the processing proceeds to step S907. The command completion processing for the CU 101 is performed.

With the configuration of the present exemplary embodiment, by dividing a command group to be processed based on a specific command type, and receiving an interrupt notification from each storage device in which the command processing of the divided command groups is completed, it is possible for the bridge device 102 to synchronize the timings.

With the above-described configuration, by generating an instruction for the storage device for each storage device in the bridge device, it is possible to provide a mirroring system in which each storage device can execute different instructions. For example, it is possible to execute reading commands such as the Read command only in the first storage device 103, which is the master side of the mirroring system. Other Embodiments While various examples and exemplary embodiments of the present disclosure have been described above, the gist and scope of the present disclosure are not limited to the specific description in the present specification.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-217570, filed Nov. 29, 2019, which is hereby incorporated by reference herein in its entirety.

What is claimed is:

1. An information processing apparatus including a first controller, a non-volatile first storage, a non-volatile second storage, and a second controller configured to communicate with the first controller and perform mirror control of the non-volatile first storage and the non-volatile second storage, the information processing apparatus comprising:
   a reception interface configured to continuously receive a plurality of requests from the first controller;
   a first memory configured to retain a first request group in which a request of a first type and a request of a second type which are received by the reception interface in a state where the mirror control is performed are arranged in order of being received by the reception interface;
   a second memory configured to retain a second request group in which the request of the first type received by the reception interface in a state where the mirror control is performed is arranged in the order of being received by the reception interface, wherein the second memory does not retain the request of the second type; and
   a first transmission interface configured to transmit the first request group retained in the first memory to the first storage and a second transmission interface configured to transmit the second request group retained in the second memory to the second storage,
   wherein after the plurality of requests is received, the second controller divides the first request group based on information of the request of the second type among requests included in the first request group retained by the first memory, transmits the divided first request group to the first storage via the first transmission interface, divides the second request group to include an amount of requests of the first type equal to an amount of request of the first type included in the divided first request group,
   and transmits the divided second request group to the second storage via the second transmission interface.

2. The information processing apparatus according to claim 1, wherein the second controller is configured to check whether a request received by the reception interface is the request of the first type or the request of the second type, and
   wherein the second controller does not check a type of the received request in a case where the request is to be retained in the first memory, and the second controller checks the type of the received request in a case where the request is to be retained in the second memory.

3. The information processing apparatus according to claim 1,
   wherein the second controller completes a transmission process when all the requests included in the first request group retained in the first memory have been transmitted by the first transmission interface.

4. The information processing apparatus according to claim 1, wherein the request of the second type is a request that generates a process of reading data from a storage device.

5. The information processing apparatus according to claim 4, wherein the request of the first type is a request that generates a process of writing data in a storage device.

6. The information processing apparatus according to claim 5, further comprising a printer configured to execute a print process of printing image data on a sheet,
   wherein the process of writing data is a process of storing in the storage device the image data used in the print process, and the process of reading data is a process of reading the image data used in the print process.

7. The information processing apparatus according to claim 1,
   wherein the second controller causes the first memory and the second memory to retain a request, based on a request received by the reception interface.

8. The information processing apparatus according to claim 1, wherein the first storage and the second storage are NVMeSSD.

9. The information processing apparatus according to claim 1, wherein each of the request of the first type and the request of the second type is a command compliant with NVMe protocol.

10. A control device including a sub controller that communicates with a main controller and performs mirror controls of a non-volatile first storage and a non-volatile second storage, the control device comprising:
    a reception interface configured to continuously receive a plurality of requests from the main controller;
    a first memory configured to retain a first request group in which a request of a first type and a request of a second type which are received by the reception interface in a state where the mirror control is performed are arranged in order of being received by the reception interface;
    a second memory configured to retain a second request group in which the request of the first type received by the reception interface in a state where the mirror control is performed is arranged in the order of being received by the reception interface, wherein the second memory does not retain the request of the second type; and
    a first transmission interface configured to transmit the first request group retained in the first memory to the first storage; and
    a second transmission interface configured to transmit the second request group retained in the second memory to the second storage,
    wherein after the plurality of requests is received, the sub controller divides the first request group based on information of the request of the second type among requests included in the first request group retained by the first memory, transmits the divided first request group to the first storage via the first transmission interface, divides the second request group to include an amount of requests of the first type equal to an amount of request of the first type included in the divided first request group, and transmits the divided second request group to the second storage via the second transmission interface.

11. The control device according to claim 10, wherein the second controller is configured to check whether a request received by the reception interface is the request of the first type or the request of the second type, and wherein the second controller does not check a type of the received request in a case where the request is to be retained in the first memory, and the second controller checks the type of the received request in a case where the request is to be retained in the second memory.

12. The control device according to claim 10, wherein the second controller completes a transmission process when all the requests included in the first request group retained in the first memory have been transmitted by the first transmission interface.

13. The control device according to claim 10, wherein the request of the second type is a request that generates a process of reading data from a storage device.

14. The control device according to claim 13, wherein the request of the first type is a request that generates a process of writing data in a storage device.

15. The control device according to claim 10, wherein each of the request of the first type and the request of the second type is a command compliant with NVMe protocol.

16. The control device according to claim 10, wherein each of the non-volatile first storage and the non-volatile second storage is NVMeSSD.

17. A method of controlling a control device including a sub controller that communicates with a main controller and performs mirror control of a non-volatile first storage and a non-volatile second storage as a mirroring system, the control device including a first memory configured to retain a first request group in which a request of a first type and a request of a second type in a state where the mirror control is performed are arranged in order of being received and a second memory configured to retain a second request group, in which the request of the first type in a state where the mirror control is performed is arranged in the order of being received, wherein the second memory does not retain the request of the second type, the method comprising:

retaining, based on the receipt of the request, the received request in at least one of the first memory and the second memory; and transmitting, in a state where request groups are retained in the first memory and the second memory, a different request group to each of the first storage and the second storage, wherein after the plurality of requests is received, the sub controller divides the first request group based on information of the request of the second type among requests included in the first request group retained by the first memory, transmits the divided first request group to the first storage, divides the second request group to include an amount of requests of the first type equal to an amount of as request of the first type included in the divided first request group, and transmits the divided second request group to the second storage.

* * * * *